United States Patent [19]

Blaine

[11] 4,439,162

[45] Mar. 27, 1984

[54] TRAINING MANIKIN FOR MEDICAL INSTRUCTION

[76] Inventor: George Blaine, 5830 Leonardo St., Coral Gables, Fla. 33146

[21] Appl. No.: 341,319

[22] Filed: Jan. 21, 1982

[51] Int. Cl.³ .............................................. G09B 23/34
[52] U.S. Cl. ................................... 434/268; 434/273; 46/22
[58] Field of Search ............... 434/262, 265, 266, 267, 434/268, 269, 270, 271, 272, 273, 274, 275; 46/22

[56] References Cited

U.S. PATENT DOCUMENTS

| | | | |
|---|---|---|---|
| 2,034,446 | 3/1936 | Saxe | 434/273 |
| 2,213,270 | 9/1940 | Chase | 434/268 |
| 2,288,296 | 6/1942 | Munro | 434/272 |
| 2,763,070 | 9/1956 | McCormick | 434/273 |
| 2,945,304 | 7/1960 | Niiranen | 434/268 |
| 3,213,550 | 10/1965 | Kittner | 434/273 |
| 3,562,924 | 2/1971 | Baermann | 434/265 |
| 4,197,670 | 4/1980 | Cox | 434/273 X |

FOREIGN PATENT DOCUMENTS 2817548 10/1979 Fed. Rep. of Germany ...... 434/272

OTHER PUBLICATIONS

"Chase Hospital Dolls", 1953, Clay-Adams Catalog, p. 173.

Primary Examiner—Harland S. Skogquist
Attorney, Agent, or Firm—Hane, Roberts, Spiecens & Cohen

[57] ABSTRACT

An instructional training manikin comprising a body including a torso, legs, arms and a head. Interchangeable male and female breasts are detachably connectible to the body. Male and female genitalia are also respectively connected to the body whereby the body can be converted between male and female model. The torso is hollow and includes fluid reservoirs therein connected to openings in the body to permit flow of fluid to and from the reservoirs for simulating various body functions and treatments. A soft flexible cover is detachably connected on the body at least to cover the female breasts and provide simulated appearance and touch of normal and diseased female breasts. A flexible buttocks simulating cover is detachably connectible to the body at the lower posterior wall thereof. The buttocks simulating cover has an aperture which registers with an anal opening in the body. The interior of the body is provided with a wall on which plates carrying normal and diseased prostate models can be attached. The body is provided with an anal aperture through which palpation of the prostate models can be effected.

20 Claims, 16 Drawing Figures

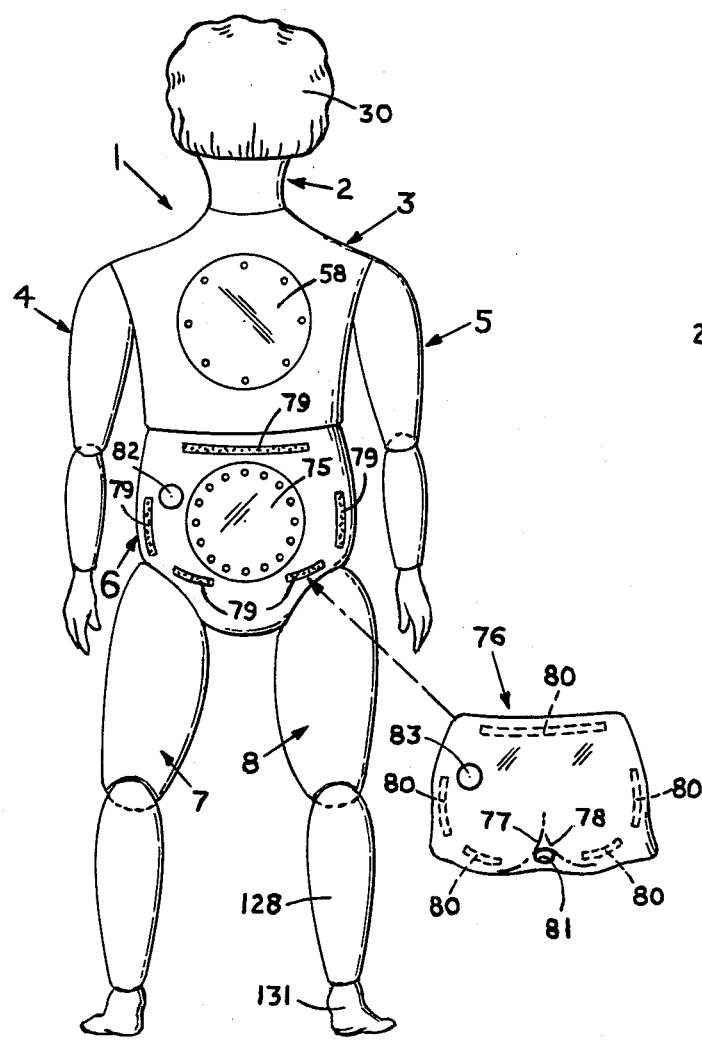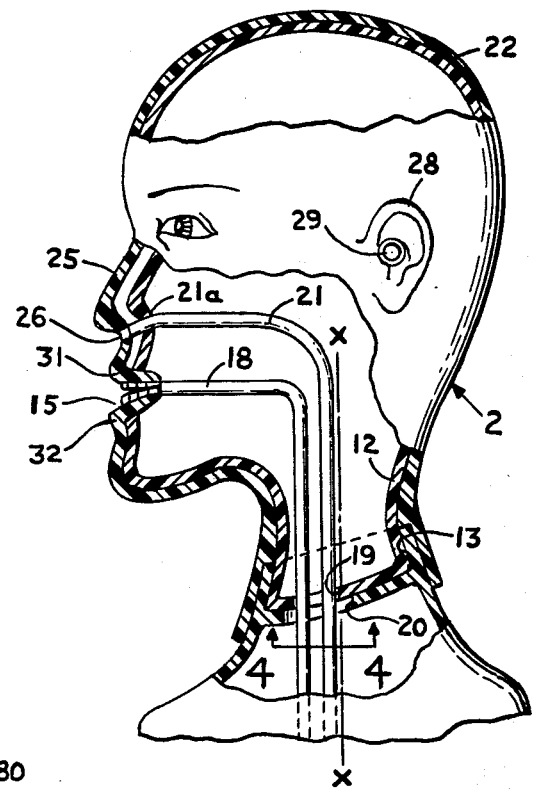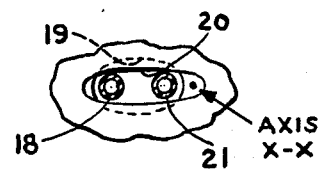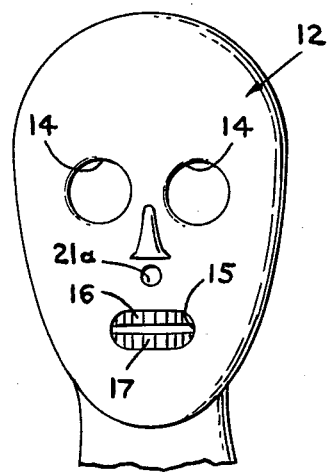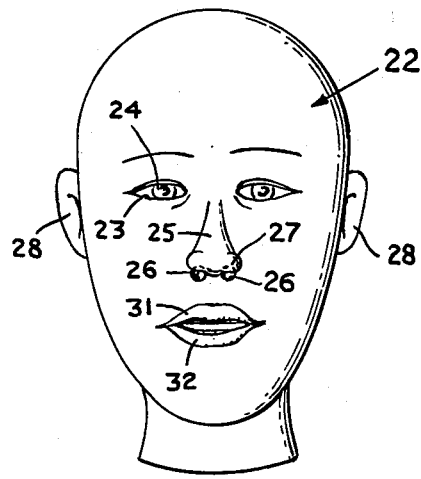
FIG. 2
FIG. 3
FIG. 4
FIG. 5
FIG. 6

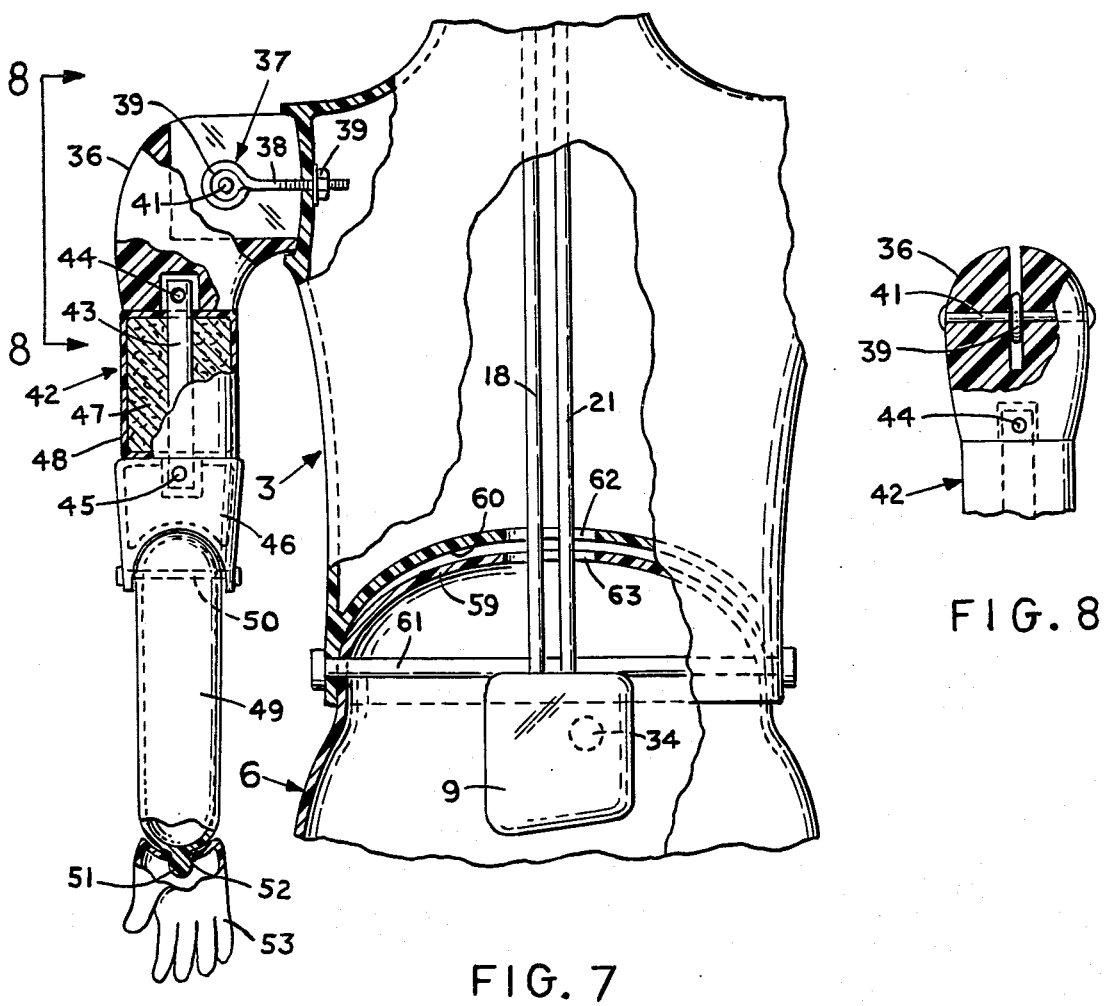
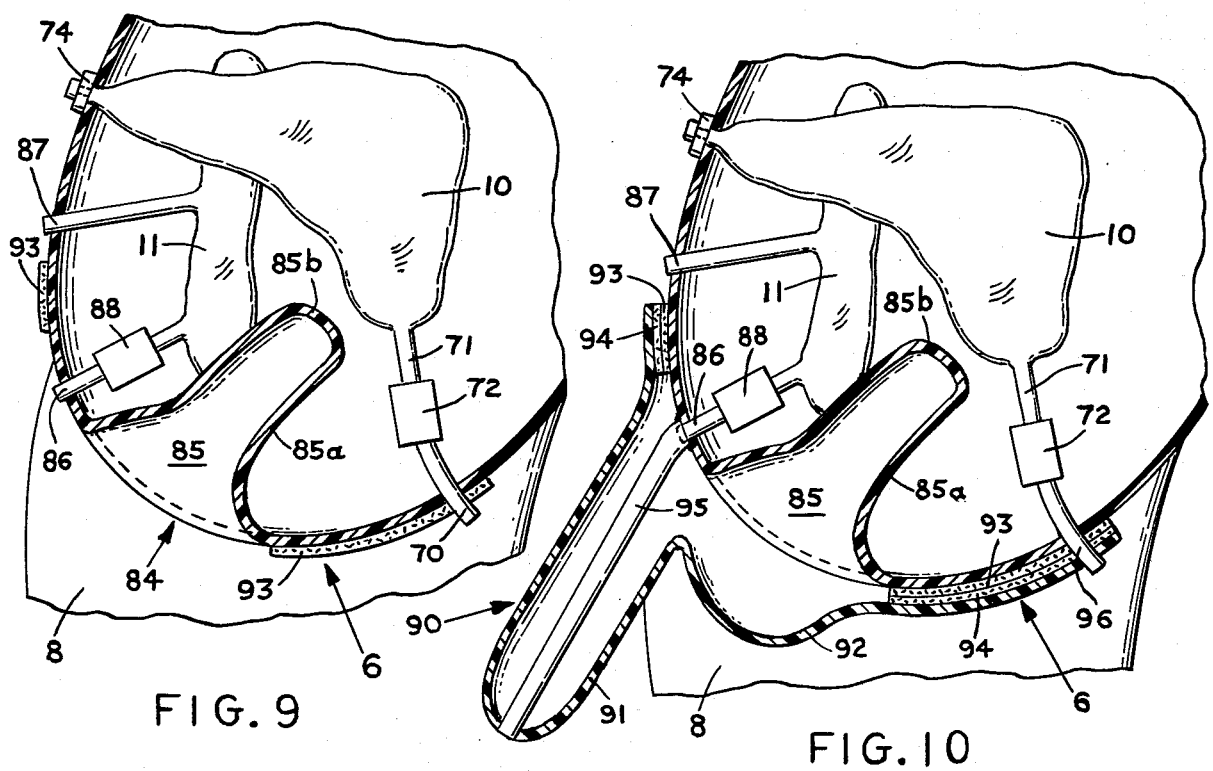

TRAINING MANIKIN FOR MEDICAL INSTRUCTION

FIELD OF THE INVENTION

The invention relates to a training manikin for medical instruction and particularly to a lifesize adult manikin providing a multitude of training exercises encountered by medical personnel in actual practice on human patients.

PRIOR ART

Known in the art are simulators of various portions of the human body for the training of medical personnel for various treatments of human conditions.

The use of simulated portions of the human body has a number of disadvantages, one of the most important of which is the absence of learning how to position the body to carry out the specific treatment. By way of example, bladder catherization requires techniques in positioning the body of the patient which cannot be carried out when only a model of the lower torso of the human body is provided.

Similarly, ostomy catherization, irrigation of the intestinal tract, and enemas all require particular positioning of the human body for proper operation and these treatments cannot be properly taught on models of only a small portion of the body.

Also known are full size manikins assisting for the training in basic medical techniques. However, these manikins are relatively simple in construction and lack any provision for distinguishing between male and female models apart from separate use of male and female genitalia.

A specific shortcoming of both the likesize manikins and the simulated body portions is the inability to teach palpation for normal and diseased female breasts and for normal and diseased male prostates.

SUMMARY OF THE INVENTION

An object of the invention is to provide a lifesize manikin adapted for conversion between male and female forms which obviates the deficiencies of the prior art.

particular object of the invention is to provide a lifesize manikin adapted for being converted between male and female forms by the replacement of male and female breasts and male and female genitalia.

A further object of the invention is to provide a manikin which will permit palpation for normal and diseased breasts.

Yet, another object of the invention is to provide a manikin which will permit palpation for normal and diseased prostates.

Still another object of the invention is to provide a manikin in which the upper torso thereof includes means for detachable connection of male and female breast inserts.

Yet, another object of the invention is to provide a cover in the upper torso region of the body at least for the female breast inserts to provide a realistic and likelike simulation of the female body particularly to enhance palpation of the breast.

Still another object of the invention is to provide a flexible cover simulating the buttocks of a patient to enable various realistic treatments in this region.

In accordance with the above and other objects of the invention there is provided an instructional training manikin which comprises a body including a torso, legs, arms and a head; the body further includes interchangeable male and female breasts comprising means for detachable connection of said breasts to said body. The body further includes male and female sexual organs respectively on the body. The body is hollow and includes fluid reservoir means therein connected via openings in the body to permit flow of fluid to and from the reservoir means for simulating various body functions and treatments.

The female breasts include normal and diseased inserts replaceably mountable on the body and a soft flexible cover for covering the inserts to provide simulated appearance and touch of normal and diseased female breasts.

The cover is detachably connected to the body to enable the selective connection of normal and diseased inserts.

The invention further comprises a flexible cover which simulates buttocks detachably connectible to the body and provided with an opening which registers with an anal opening in the body when the flexible cover is attached to the body.

The invention further provides for a crossplate in the body and means for removable attachment of normal and diseased prostate models on said crossplate. The body further includes anal aperture means providing access to a finger of a user to palpate the prostate model. The means for removable attachment of normal and diseased prostate models includes a plate supporting each prostate model and means for removable attachment of each said plate to the crossplate.

The invention will be described in greater detail hereafter with reference to the attached drawings.

BRIEF DESCRIPTION OF THE DRAWINGS

FIG. 2 is a rear elevational view of the manikin also with selected parts shown separated from the manikin.

FIG. 3 is an elevational view of the head of the manikin, shown partly broken away and in section.

FIG. 4 is a view taken on line 4—4 in FIG. 3.

FIG. 5 is a front view of a skull portion of the head in FIG. 3.

FIG. 6 is a front view of a cover portion of the head in FIG. 3.

FIG. 7 is a rear elevational view partly broken away and in section of a portion of the manikin.

FIG. 8 is a elevational view taken along line 8—8 in FIG. 7.

FIG. 9 is a sectional view through the lower part of the lower torso of a first embodiment according to the invention for a female manikin.

FIG. 10 is a sectional view similar to FIG. 9 which is adapted for use as a male manikin.

DETAILED DESCRIPTION

Figure 1:
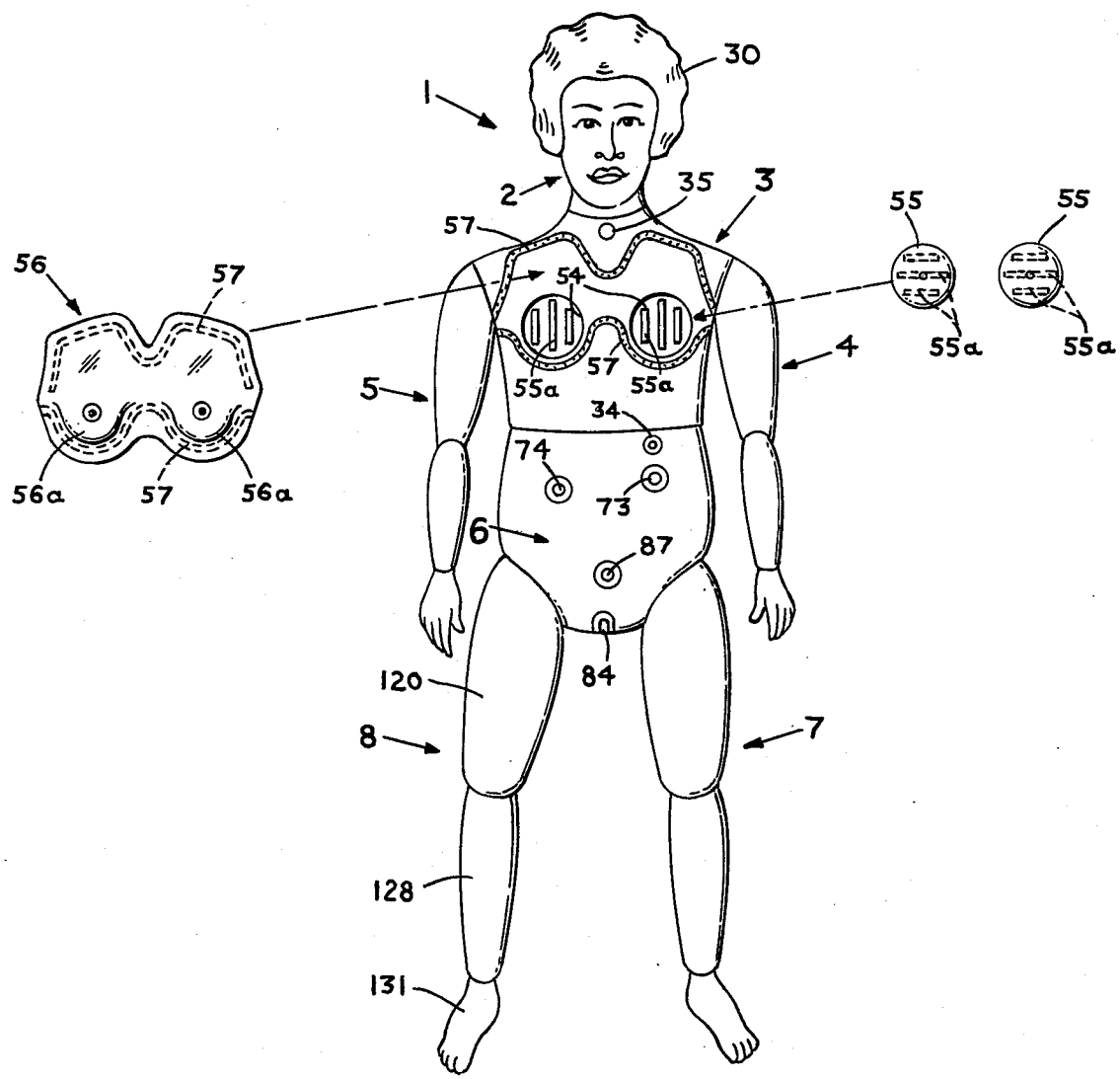
FIG. 1 is a front elevational view of a training manikin according to the invention with selected parts separated from the manikin.

In the drawing there is seen a training model or manikin 1 simulating a lifesize adult human. The external appearance of the model is female, but as will be seen in detail later, external male genitalia can be attached to the model, female breasts can be replaced with male breasts and the head can be replaced to convert the model to a male model.

The model 1 essentially comprises a body consisting of: a head 2; an upper torso 3 into which the head 2 is fitted for limited turning movement from side to side; left and right arms 4 and 5 hingeably connected to the upper torso 3; a lower torso hingeably connected to the upper torso 3 for limited forward and backward movement to provide 30° bending at the waist; and left and right legs 7 and 8 hingeably connected to the lower torso.

The interior of the body is hollow and is provided with three reservoirs or bags 9, 10, 11 in the lower torso for containing fluids for various training purposes as will be explained in detail later.

The body is composed of a vinyl plastic material simulating a lifelike feel and it is flexible and has high resistance to wear and tear. The surface of the model is smooth, impervious to water, oils and linaments.

The head 2 comprises a rigid skull 12 which is fitted in an aperture 13 in the upper torso 3 for rotation about axis X—X. The skull is composed of a relatively rigid plastic material and is provided with eye sockets 14 in the form of holes for receiving the eyes of the model as will be seen later. The skull is provided with a mouth opening 15 in which upper and lower rows of teeth 16 and 17 are mounted. The upper row of teeth 16 is fixed in the skull and the lower row of teeth 17 is hingeably connected in opening 15 for opening and closing movements with respect to the upper row of teeth. At the back of the mouth opening 15 there is fixed a tube 18 which extends into the interior of the upper torso, through an opening 19 in the skull and an opening 20 in the upper torso. A tube 21 is fixed in a nasal opening 21a in skull 12 and also passes through openings 19 and 20. The opening 20 is elongated as seen in FIG. 4 and is offset from the axis of rotation X—X such that as the head is rotated in the upper torso, the tubes 18 and 21 which are fixed in the skull will travel in the elongated opening 20 which serves as stops for turning movement of the head. In this way the head can be turned from side to side over an angle of travel equivalent to that of a normal human.

Fitted on the skull is cover 22 which represents the outer skin of the head. The cover 22 forms the face of the model and is provided with eye openings 23 into which eyes 24 are separately inserted and secured. The skin 22 can be pulled away from the eyes 24 to similate medical technqiues for treatment of the eyes as in the demonstration of orbital medications such as introducing drops or ointments into the conjunctival sac, the removal of foreign bodies and eye irrigation.

The cover 22 is formed with a nose 25 having nasal openings 26. The tube 21 in nasal opening 21a in the skull is accessible through the nasal openings 26. The nose 25 is flexible and is formed with nostrils 27 around openings 26. The nostrils 27 can be pinched to close off nasal openings 26 in teaching cardio-pulmonary resuscitation techniques.

The cover 22 includes integrally molded ears 28 and the left ear 28 is fitted with a tube 29 which extends through an aperture in the skull into the interior thereof. The tube 29 is closed at its inner end thus permitting ear syringing exercises.

The cover 22 is provided with a wig 30 (not shown in FIG. 3) which not only adds to the realism of the model but also permits exercises in combing, shampooing and head draping of the female patient.

The face is formed with upper and lower lips 31 and 32. The upper lip 31 extends above the upper row of teeth 16 whereas the lower lip covers the lower row of teeth 17. This simulates a natural position of the mouth of the model. The cover 22 is loosely fitted on the skull 12 around the mouth so that the lips 31 and 32 can be pulled away from the teeth in a natural manner to provide access thereto and to the interior of the mouth. Thereby mouth hygiene can be demonstrated. Furthermore, the hinge movement of the lower row of teeth 17 simulates a natural movement of the lower jaw.

The mouth tube 18, and the nasal tube 21 are connected to reservior 9 which serves as a stomach reservoir and is in the form of a bag of a size of the order of 16 oz. The stomach reservoir 9 communicates with a gastrostomy opening 34 (FIG. 1). A No. 10 Levine tube can be used for the demonstration of tube feeding and gastric suction. Bougies, for dilation exercises can also be passed.

The upper torso 3 is provided with a tracheotomy opening 35 to receive a tracheotomy tube. Insertion and dressing exercises can thereby be demonstrated.

The left arm 4 comprises an upper shoulder portion 36 hingeably attached to the upper torso 3 for universal movement by a connection 37. The connection 37 comprises a pin 38 threadably engaged in a nut 39 rotatably mounted in upper torso to permit rotation on pin 38 about its axis. The pin 38 is formed with a loop 39 at its remote end which is fitted in a slot 40 in shoulder portion 36. The loop 39 rotatably receives pin 41 secured in shoulder portion 36 whereby the shoulder portion 36 can rotate about pin 41.

An upper arm section 42 is attached to shoulder portion 36 and serves as an injection site for intra-muscular, subcutaneous, and intradermal injections. The upper arm section 42 includes a central rod 43 which is replaceably secured at its opposite ends with pins 44 and 45 respectively secured to shoulder portion 36 and a lower arm section 46. A cylindrical ethofoam sleeve 47 is mounted on rod 43 and a lifelike, surgical, elastic latex skin 48 surrounds the ethafoam unit. Injections can therefore be given anywhere on the circumference of the arm for correct training. The ethofoam sleeve is removable and replaceable as necessary. For this purpose the cylindrical sleeve 47 is slit longitudinally so that when the surgical skin 48 is removed, the sleeve 47 can be removed from rod 43 and replaced with a fresh sleeve. A new elastic skin 48 is then fitted on the sleeve 47. Then the rod 43 with the fresh ethofoam sleeve 47 and latex skin 48 thereon is then affixed to the shoulder portion 36 and lower arm section 46 by pins 44 and 45.

A forearm 49 is pivotably connected by pin 50 to arm section 46. At its lower end the forearm 49 has a ball portion 51 which is tightly fitted into a hole 52 formed in a hand 53. The hand 53 is formed of soft vinyl plastic which is rotatable on the forearm 49. The hand 53 is formed with fingers which are separated to permit bandaging exercises.

The joints of the various parts of the arm are strong and allow lifelike movements even to the extent of permitting pronation and supination of the forearm.

The right arm of the model is identical to the left arm except that the lower arm section 46 is integrated with the shoulder portion 36 and the injection site 42 is omitted.

The anterior wall of the upper torso 3 is provided with recesses 54 into which breast inserts 55 are replaceably mounted. For the replaceable mounting of the breast inserts, Velco strips 55a can be mounted in the recesses 54 and on the back of the inserts 55. In the case of female breast inserts 55 a large number thereof can be provided to simulate various disorders of the breast enabling, for example, breast palpation for tumor detection. The Velcro strips make removal and replacement of the breast inserts very simple. In order to simulate a natural appearance and permit life-like palpation exercises, the upper torso 3 is fitted with a flexible, one-piece elastic cover 56 simulating human skin to cover the breast inserts 55. The plastic cover 56 is removably fitted on the upper torso 3 by means of Velcro strips 57 on the upper torso 3 and on the back of cover 56 along the periphery thereof. The cover 56 is formed with molded breast portions 56A for fittingly covering the inserts 55 and providing a realistic appearance and means to permit life-like palpation instruction.

Figure 1A:
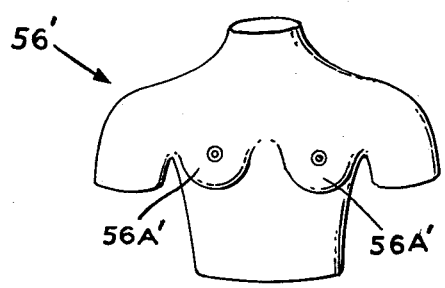
FIG. 1A is a front view of a cover portion according to a modification.

In a modification as shown in FIG. 1A, the elastic cover 56' is of shirt-like configuration to cover the entire upper torso 3. The shirt-like cover 56' is shown with two sleeves but in a modification it can be formed with a single sleeve, the other arm being left free to permit palpation of the axilla. The cover 56' can be provided with a rear closure having snaps, a zipper or the like, to enable the cover to be applied and removed to permit replacement of breast inserts. The cover 56' is formed with molded breast portions 56'A similar to those in cover 56.

The posterior wall of the upper torso 3 is provided with a removable back plate 58 which furnishes access to the interior of the upper torso and to tubes 18 and 21. In the embodiment in which the elastic cover covers the entire upper torso, the removable back plate is omitted and the posterior wall of the upper torso is given the natural shape of the human back to permit exercises in massaging, rubdowns, and other patient handling techniques.

The lower torso 6 has an upper rounded portion 59 of bowl shape which is rotatably fitted into a recessed bowl-shape portion 60 formed in the upper torso 3. A transverse pin 61 is secured to the upper torso and rounded portion 59 is rotatable on pin 61. Thereby, the upper and lower torsos are rotatable with respect to one another around pin 61. The degree of pivotal movement of the upper and lower torsos is limited by end stops (not shown) on the portions 59 and 60 to permit bending from the waist through and angle of 30° as in the human. The tubes 18 and 21 pass through enlarged holes 62 and 63 respectively in the upper and lower torsos 3 and 6 to accommodate the bending movements of the upper and lower torsos.

The lower torso 6 is hollow and contains reservoirs 9, 10 and 11. As previously noted, reservoir 9 is a stomach reservoir to which are connected mouth tube 18, nasal tube 21 and gastrostomy opening 34. The reservoir 10 serves as an intestinal reservoir of a capacity of about 66 oz. and the reservoir 11 as a bladder reservoir also of a capacity of about 66 oz.

The lower torso 6 is formed with an anal opening 70 to which is fitted a tube 71 containing a non-return one-way valve 72. The tube 71, valve 72 and reservoir 10 serve as the intestinal tract. The tube 71 is connected to reservoir 10. The lower torso is also formed with a transverse colostomy site 73 and an ileostomy site 74. The sites 73 and 74 are realistically formed as plug-like stomas typifying human tissue following colostomies and ileostomies thus permitting ostomy dressings and maintenance exercises. The stomas 73 and 74 are formed with openings which are connected to the intestinal reservoir 10. A site for ascending colostomy can be provided and connected to reservoir 10 if desired. Additional openings (not shown) can be provided as necessary and include a liver puncture site, a kidney puncture site and a spinal puncture site. Each of these sites includes an opening with an ethofoam insert to allow passage of a syringe needle. The liver and kidney puncture sites are intended to simulate the taking of biopsies and the spinal puncture site the aspiration of spinal fluid.

The intestinal tract can be used for irrigation and enema exercises as on a human patient. For this purpose, one-way valve 72 is of conventional construction and comprises two adjacent diaphragms with respective slits disposed at right angles to one another. Thereby, liquid in reservoir 10 will not backflow past valve 72. An enema is administered by inserting an enema nozzle into anal opening 70 and valve 72 with the model lying on the left side. The position of the reservoir 10 is such that with the model lying on either side, the pressure head of the liquid in the reservoir acting on valve 72 will be insufficient to deform the diaphragms and there will be little or no spillage. To prevent airlock, at least one of the ostomy openings 73 and 74 is left open when commencing administration of the enema whereafter the openings 73 and 74 are closed to prevent overspill. Plug inserts can be employed to close openings 73 and 74. To drain the reservoir 10, the model is seated over a receptacle such as a bed pan and a tube is passed through anal opening 70 and valve 72 into reservoir 10.

The posterior wall of the lower torso 6 is formed with a removable backplate 75 which furnishes access to the interior of the lower torso 6 and particularly to the reservoirs 9,10,11.

Instead of the backplate 75 in the lower torso 6 and the backplate 58 in the upper torso 3, access can be obtained to the interior of the upper and lower torsos through the openings 62 and 63 which can be increased in size, if necessary. Thus, the torsos will not be interrupted by the backplates and will be continuous and smooth. The openings 62 and 63 are normally concealed in use of the manikin which is of further advantage since it adds to the realism of the manikin.

In order to provide realism in administration of enemas and for buttock examination of a patient, a one-piece flexible cover 76 is replacably attachable to the posterior wall of the lower torso. The cover 76 is made of elastic, vinyl material with simulated left and right buttocks 77 and 78 molded therein. The lower torso 6 is provided with Velcro strips 79 which may, if desired, be continuous and the flexible cover 76 is furnished with corresponding Velcro strips 80 by which the cover 76 may be securely and releasably attached to the lower torso. The cover 76 is provided with an opening 81 which registers with anal opening 70 and by which enemas can be administered in a fashion simulating the human condition. In this regard, the presence of the flexible cover is realistic in enema administration since it is necessary to raise one of the flexible buttocks to locate the anal opening for insertion of the enema nozzle. An injection site is provided in the buttock region of the model for intramuscular injection exercises into the gluteal region and the injection site comprises a replaceable absorbent foam pad 82 removably housed in a cup-like notch in the posterior wall of lower torso 6 in the upper outer quadrant of the gluteal region of the left side for proper training. The upper left buttock 77 of cover 76 is formed with a designated region 83 which registers with pad 82 when the cover 76 is installed on the model. Injections are given through the "skin" of cover 76 into the pad 82 to provide realism in training exercises. The region 83 may also be replaceable should it become worn after a number of injections have been administered.

The model comprises female genitalia including a vulva region 84 having a vaginal opening 85 leading to a vaginal passage 85a which is closed at its inner end 85b. The passage 85a has a length of about 3" to enable teaching douching and the taking of a Pap smear. Located above the vaginal opening 85 is a tube 86 simulating the urethal passage. The tube 86 is connected to the bladder reservoir 11. Above the tube 86 is a further tube 87 serving as a suprapubic opening following a cystotomy which is also connected to bladder reservoir 11. A valve 88 is mounted in tube 86 and tube 87 is connected without a valve to reservoir 11. The valve 88 is of the same construction as valve 72 and includes two slit diaphragms which make catherization exercises lifelike. Fluid can only be withdrawn from the bladder reservoir 11 via tube 86 after insertion of a catheter in tube 86. The suprapubic opening 87 can be used both for filling the bladder reservoir 11 and for drainage. In order effect catherization it is necessary to pivot the legs 7 and 8 so that the thigh regions thereof are abducted for proper position for catherization.

In order convert the model to a male manikin, the interchangeable female breast inserts 55 are replaced with male breast inserts and cover 56 of female form is either left off or replaced by a cover of male form. The head 2 may be replaced by a male head. The female genitalia is covered by a releasably attachable male unit 90 molded from a soft pliable plastic material comprising a penis 91 and a scrotum 92. The lower torso 6 is provided with Velcro strips 93 to which are secured corresponding Velcro strips 94 on the back of male unit 90. A urethral passage 95 extends within the penis 91 and connects with urethral tube 86 so that catherization of the male can be taught. An anal opening 96 in the male unit 90 comes into registry with anal opening 70 when the male unit 90 is installed whereby enemas can be administered to the model when it is converted to a male.

Figure 11:
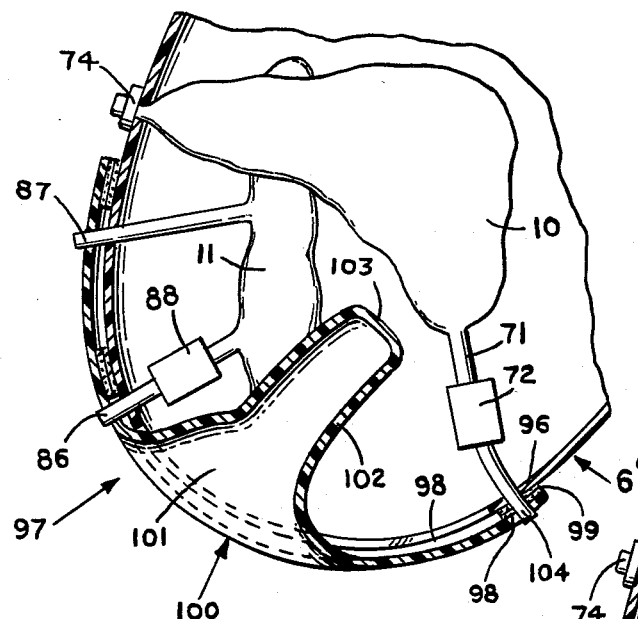
FIG. 11 is a sectional view similar to FIG. 9 of a second embodiment of a female manikin.
Figure 12:
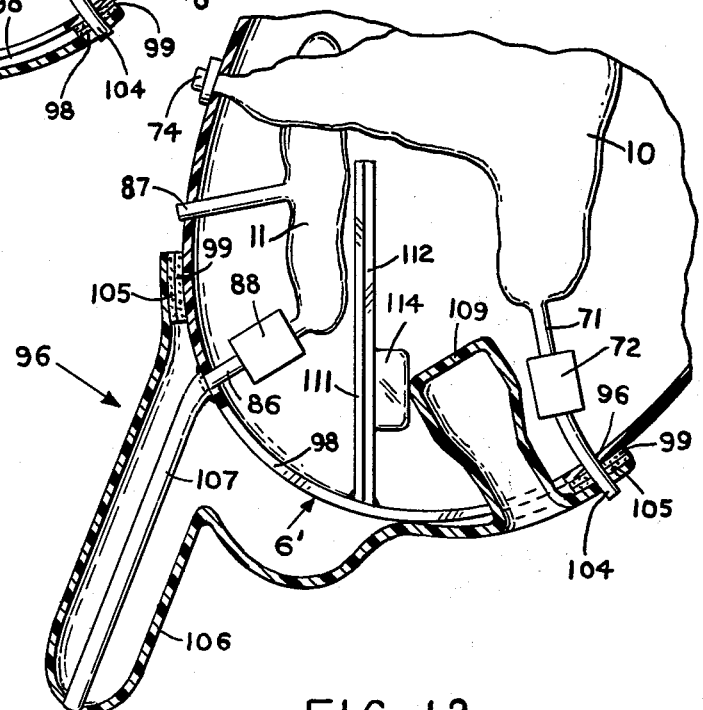
FIG. 12 is a sectional view similar to FIG. 11 which is adapted for use on a male manikin.
Figure 13:
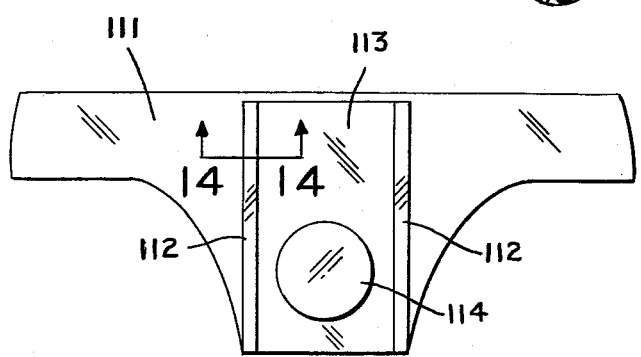
FIG. 13 is an elevational view of a part of the embodiment in FIG. 12.
Figure 14:
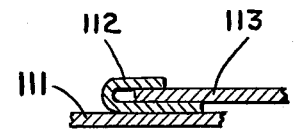
FIG. 14 is a sectional view taken on line 14—14 in FIG. 13.
Figure 15:
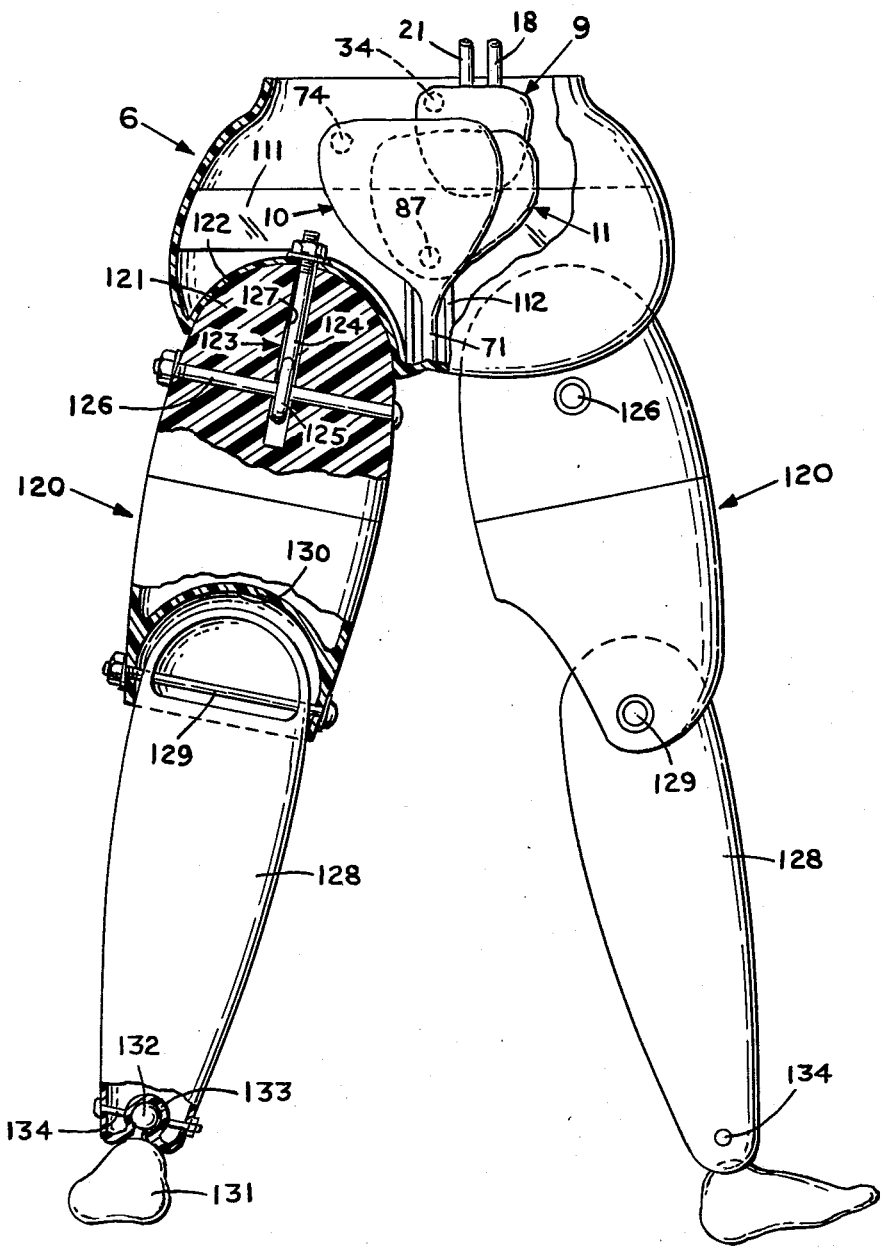
FIG. 15 is a rear elevational view partly broken away and in section of the lower portion of the manikin in FIG. 2.

In a modification, when the manikin is to be employed for prostate examination of the male, the lower torso is of the construction as shown in FIGS. 11 and 12 to selectively receive a male unit 96 (FIG. 12) or a female unit 97 (FIG. 11). The lower torso is designated by indicia 6' and is formed with urethral tube 86 and suprapubic tube 87 as before. The lower torso 6' is formed with an elongated opening 98 of relatively large extent from a point just beyond tube 86 to a point just before anal opening 96. The female unit 97 is attached to lower torso 6' by mean of Velcro strips 98 on the unit 97 at the extremities thereof which releasably attach to corresponding Velcro strips 99 on the torso 6'. The female unit 97 is formed with a vulva region 100 having a vaginal opening 101 leading to a vaginal passage 102 closed at inner end 103. Unit 97 is provided with an anal opening 104 which registers with opening 96 to enable teaching administration of enemas as in the previous embodiment. The assembly illustrated in FIG. 11 operates in the same manner as the embodiment in FIG. 9.

The male unit 96 illustrated in FIG. 12 is attached by Velcro strips 105 to Velcro strips 99 on torso 6'. The male unit 96 includes penis 106 containing urethral passage 107 which connectes to urethral tube 86. The male unit 96 further includes scrotum 108. Additionally, the male unit comprises a flexible rectal passage 109 which is accessible through an anal opening 110. The anal opening 96 in the lower torso 6' is covered by the male unit 96 and no longer is accessible. Fixed in the lower torso is a rigid cross plate 111 which extends transversely across the lower torso in the interior thereof. A pair of parallel, vertical guides 112 are secured on cross plate 111 and are adapted to slidably receive a plate 113 on which a prostate sample 114 is attached. When the plate 113 is lowered to a stop position the prostate 114 is positioned immediately forward of the rectal passage 109. In order to simulate examination of the prostate through the rectum, the user inserts a finger through anal opening 110 and can feel the prostate through rectal passage 109. A number of different prostate samples can be engaged one by one in slides 112 to give the user different tactile sensations with normal and diseased prostates. In this particular embodiment, the use of the manikin for instruction in enema administration is eliminated, however, for such instruction it is only necessary to replace male unit 96 with male unit 90.

For catherization exercises, a catheter is introduced into the urethral passage 86 (directly in the case of the female model and via the urethral passage 95 in the embodiment of FIG. 10 and via the urethral passage 107 in the embodiment of FIG. 12). Fluid will be withdrawn from the bladder reservoir through the inserted catheter. The suprapubic opening 87 can be used both for filling the bladder reservoir and for drainage.

For teaching ostomy care, the intestinal reservoir 10 is filled either via one of ostomies 73 or 74 or via the rectal passage and drainage or excretion at the ileostomy or colostomy is effected. The stomas at the ostomies 73,74 and 87 are anatomically life-like and can be dilated for teaching this practice while also providing for application of dressings and maintenance exercises. The stomas are replaceably inserted and fixed in place in the lower torso 6 and can be replaced when worn.

The legs 7 and 8 identical constructions and each includes a thigh portion 120 having an upper spherical portion 121 which is rotatably fitted in a spherical socket portion 122 formed in lower torso 6. The thigh portion 120 is connected to portion 122 by a connection 123 which is identical to connection 37 joining the upper shoulder 36 to the upper torso and therefore will not be described in great detail. Connection 123 includes pin 124 with loop 125 thereon which is rotatable on pin 126 fixed to portion 120. The pin 124 is fee to travel in slot 127 provided in portion 120. The connection 123 allows the spherical portion 121 to undergo universal movement within limits in socket portion 122.

A lower leg portion 128 is hingeably connected to thigh portion 120 by a pin 129 such that the lower leg portion is free to rotate about pin 129 while traveling in a recess 130 in thigh portion 120 which defines the extent of pivotal movement of the lower leg portion.

A soft pliable molded foot 131 is hingeably connected to the lower end of the leg portion 128 by engagement of a ball 132 on foot 131 in a socket 133 on leg portion 128. The ball is held in the socket by a pin 134. The need for pin 134 is obviated when the ball is tightly fitted in the socket.

Although the invention has been described in relation to specific embodiments thereof, it will be apparent to those skilled in the art that numerous modifications and variations can be made within the scope and spirit of the invention as defined by the attached claims.

By way of example, although attachment of various parts has been indicated as being effected by Velcro connections, other equivalents are possible.

What is claimed is:

1. An instructional training manikin comprising a body including a torso, legs, arms and a head, interchangeable male and female breasts including means for detachable connection of said breasts to said body, said body further including male and female sexual organs adapted for selective operative association with said body, said torso being hollow and including fluid reservoir means therein, said body being provided with opening means permitting flow and fluid to and from said reservoir means for simulating various body functions and treatments.

2. A manikin as claimed in claim 1, wherein said opening means includes a colostomy opening, an ileostomy opening, a suprapubic cystotomy drainage opening, a urethral opening, and an anal opening, and means connecting said openings to said reservoir means.

3. A manikin as claimed in claim 2 comprising plug-like coverings for said colostomy, ileostomy and suprapubic drainage openings, said plug-like coverings being on said body and simulating the appearance of human tissue following colostomy, ileostomy and cystotomy.

4. A manikin as claimed in claim 1, wherein said female breasts include normal and diseased inserts, and a soft, flexible cover on said body to cover said inserts and provide simulated appearance and touch of normal and diseased female breasts.

5. A manikin as claimed in claim 4 comprising means for detachably connecting said cover to said body.

6. A manikin as claimed in claim 5, wherein the detachable connection means comprises Velcro strips.

7. A manikin as claimed in claim 4, wherein said cover comprises molded breast portions.

8. A manikin as claimed in claim 7, wherein said cover is of shirt-like configuration.

9. A manikin as claimed in claim 1, wherein said body includes means providing access to said reservoir means.

10. A manikin as claimed in claim 9, wherein said means providing access to said reservoir means comprises an aperture means in said body.

11. A manikin as claimed in claim 10, wherein said aperture means is positioned in said body to be hidden in normal use.

12. A manikin as claimed in claim 1, wherein said opening means includes an anal opening connected to said reservoir means, said manikin further comprising a flexible cover simulating buttocks detachably connectible to said body, said flexible cover being provided with an opening which registers with said anal opening when the flexible cover is attached to said body.

13. A manikin as claimed in claim 12 comprising detachable connection means connecting said flexible cover to said body including Velcro strips.

14. A manikin as claimed in claim 12, wherein said body includes a posterior wall provided with an injection site, said flexible cover being further provided with an injection region which registers with said injection site when the flexible cover is attached to said body.

15. A manikin as claimed in claim 14 comprising a removable back plate in the posterior wall of said body, said flexible cover covering said back plate when connected to said body.

16. A manikin as claimed in claim 1 comprising a crossplate in said body and means for removable attachment of normal and diseased prostate models on said crossplate, said body including anal aperture means providing access by a finger of a user to palpate the prostate model attached to said crossplate.

17. A manikin as claimed in claim 16, wherein said means for removable attachment of normal and diseased prostate models includes a plate supporting each prostate model and means for removable attachment of each said plate to said crossplate.

18. A manikin as claimed in claim 17, wherein said opening means includes a urethral opening and said male sexual organ is provided with a passage providing communication with said urethral opening.

19. A manikin as claimed in claim 1, wherein said female sexual organs and said body are integrally formed, said male sexual organs being detachably connectible to said body to cover said female sexual organs while being accessible to said opening means.

20. A manikin as claimed in claim 1 comprising one-way valve means connecting at least a selected one of said opening means and said reservoir means.

* * * * *